(12) United States Patent
Duchin et al.

(10) Patent No.: US 10,819,733 B2
(45) Date of Patent: *Oct. 27, 2020

(54) IDENTIFYING VULNERABILITIES IN PROCESSING NODES

(71) Applicant: EMC IP Holding Company LLC, Hopkinton, MA (US)

(72) Inventors: Zohar Duchin, Brookline, MA (US); Michelle Zhong, Marietta, GA (US); Ehsan Masud, Leesburg, VA (US); Yassine Ouhssain, Waltham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 204 days.

This patent is subject to a terminal disclaimer.

(21) Appl. No.: 16/044,147

(22) Filed: Jul. 24, 2018

(65) Prior Publication Data
US 2020/0036741 A1 Jan. 30, 2020

(51) Int. Cl.
*H04L 29/00* (2006.01)
*H04L 29/06* (2006.01)
*G06F 9/455* (2018.01)

(52) U.S. Cl.
CPC ...... *H04L 63/1433* (2013.01); *G06F 9/45558* (2013.01); *H04L 63/1416* (2013.01); *H04L 63/20* (2013.01); *G06F 2009/45587* (2013.01)

(58) Field of Classification Search
CPC . H04L 63/1433; H04L 63/1416; H04L 63/20; G06F 9/45558; G06F 2009/45587
See application file for complete search history.

(56) References Cited

U.S. PATENT DOCUMENTS

| | | | | |
|---|---|---|---|---|
| 9,787,705 | B1 * | 10/2017 | Love | H04L 63/1425 |
| 9,825,989 | B1 * | 11/2017 | Mehra | H04L 63/145 |
| 10,038,700 | B1 * | 7/2018 | Duchin | H04L 67/303 |
| 10,121,009 | B2 * | 11/2018 | Kuhr | G06F 21/577 |

(Continued)

OTHER PUBLICATIONS

Wikipedia, "Cosine Similarity," https://en.wikipedia.org/wiki/Cosine_similarity, Jun. 20, 2018, 5 pages.

(Continued)

*Primary Examiner* — Don G Zhao
(74) *Attorney, Agent, or Firm* — Ryan, Mason & Lewis, LLP (57) ABSTRACT

A method includes scanning a subset of a plurality of processing nodes in a network for vulnerabilities, selecting a first one of the processing nodes not in the subset, and determining a similarity measure between the first processing node and at least a second one of the processing nodes in the subset identified as having a given vulnerability. Determining the similarity measure comprises determining a first similarity between vulnerabilities previously detected on the first and second processing nodes and determining a second similarity between attributes of the first and second processing nodes, the similarity measure being based at least in part on the first and second similarities. The method also includes identifying that the first processing node has the given vulnerability based at least in part on the similarity measure, and modifying access to the first processing node responsive to identifying that the first processing node has the given vulnerability.

20 Claims, 5 Drawing Sheets

(56) References Cited

U.S. PATENT DOCUMENTS

| | | | | |
|---|---|---|---|---|
| 10,516,567 | B2* | 12/2019 | Foster | H04L 43/062 |
| 10,523,699 | B1* | 12/2019 | Alamuri | H04L 63/08 |
| 10,579,803 | B1* | 3/2020 | Mueller | G06F 8/70 |
| 2008/0120305 | A1* | 5/2008 | Sima | G06F 16/951 |
| 2010/0305913 | A1* | 12/2010 | Johnson | G06Q 10/04 |
| | | | | 703/2 |
| 2012/0036580 | A1* | 2/2012 | Gorny | H04L 63/1433 |
| | | | | 726/25 |
| 2013/0091577 | A1* | 4/2013 | McGinley | G06F 21/00 |
| | | | | 726/25 |
| 2014/0245376 | A1* | 8/2014 | Hibbert | H04L 63/1433 |
| | | | | 726/1 |
| 2015/0271199 | A1* | 9/2015 | Bradley | H04L 63/1441 |
| | | | | 726/25 |
| 2016/0132550 | A1* | 5/2016 | Gnocato | G06N 7/005 |
| | | | | 707/752 |
| 2017/0093893 | A1* | 3/2017 | Davydov | H04L 63/1416 |
| 2017/0093910 | A1* | 3/2017 | Gukal | H04L 63/1416 |
| 2017/0185783 | A1* | 6/2017 | Brucker | G06F 21/577 |
| 2017/0214708 | A1* | 7/2017 | Gukal | H04L 63/1433 |
| 2017/0264644 | A1* | 9/2017 | Mihan | G06F 21/554 |
| 2017/0300698 | A1* | 10/2017 | Chawla | G06F 16/951 |
| 2017/0331840 | A1* | 11/2017 | Ranjan | H04L 63/1416 |
| 2017/0366562 | A1* | 12/2017 | Zhang | H04L 63/1416 |
| 2018/0129811 | A1* | 5/2018 | Diu | G06F 21/577 |
| 2018/0191764 | A1* | 7/2018 | Chawla | H04L 63/12 |
| 2018/0278642 | A1* | 9/2018 | Joy | H04L 63/1433 |
| 2019/0096217 | A1* | 3/2019 | Pourmohammad | G06F 40/30 |
| 2019/0138512 | A1* | 5/2019 | Pourmohammad | G05B 15/02 |
| 2019/0258807 | A1* | 8/2019 | DiMaggio | H04L 41/28 |
| 2019/0306173 | A1* | 10/2019 | Reddy | G06F 11/00 |
| 2020/0012796 | A1* | 1/2020 | Trepagnier | G06K 9/6218 |

OTHER PUBLICATIONS

Nishadh Aluthge, "IoT Device Fingerprinting with Sequence-Based Features," University of Helsinki, Department of Computer Science, Dec. 12, 2017, 71 pages.

Miranda Mowbray, "Detecting Security Attacks on the Enterprise Internet of Things: an Overview," Hewlett Packard Labs, HPE-2017-04, Jan. 23, 2017, 17 pages.

E. Nwafor et al., "Anomaly-Based Intrusion Detection of IoT Device Sensor Data Using Provenance Graphs," 1st International Workshop on Security and Privacy for the Internet-of-Things (IoTSec), Apr. 2018, 4 pages.

Qualys, Inc., "Offline Scanner Appliance User Guide," Qualys, Feb. 7, 2018, 24 pages.

* cited by examiner

PROCESSING NODE (PN) ATTRIBUTE VECTOR

| | WINDOWS | LINUX | IS SERVER | IS DATABASE | CRITICAL | LOCATION | BUSINESS UNIT |
|---|---|---|---|---|---|---|---|
| PN #1 | 0 | 0 | 1 | 0 | 0 | ISR | HR |
| PN #2 | 1 | 0 | 1 | 0 | 0 | US | HR |
| PN #3 | 0 | 1 | 0 | 0 | 0 | US | FINANCE |
| PN #4 | 0 | 0 | 0 | 1 | 1 | CA | DEV. |

302

COMMON VULNERABILITIES AND EXPOSURES (CVE) VULNERABILITY VECTOR

| | CVE #1 | CVE #2 | CVE #3 | CVE #4 | CVE #5 | CVE #6 | CVE #7 | CVE #8 | CVE #9 | CVE #10 |
|---|---|---|---|---|---|---|---|---|---|---|
| PN #1 | 0 | 0 | 1 | 0 | 0 | 0 | 1 | 0 | 1 | 0 |
| PN #2 | 1 | 0 | 1 | 0 | 0 | 0 | 1 | 0 | 0 | 0 |
| PN #3 | 0 | 1 | 0 | 1 | 1 | 0 | 0 | 0 | 0 | 0 |
| PN #4 | 0 | 0 | 0 | 0 | 0 | 0 | 0 | 1 | 0 | 1 |

IDENTIFYING VULNERABILITIES IN PROCESSING NODES

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats include, for example, vulnerabilities in devices in an enterprise network, which present risks that can expose the enterprise and its users or devices. As enterprise networks continue to grow in scale, the task of scanning for such vulnerabilities in enterprise devices presents various challenges.

SUMMARY

Illustrative embodiments of the present invention provide techniques for identifying undetected vulnerabilities in processing nodes, such as processing nodes in a network that are offline, unavailable or which were otherwise not scanned during a scan of the network. Embodiments advantageously provide enhanced security while also reducing time and resources required for scanning a network.

In one embodiment, a method comprises scanning a subset of a plurality of processing nodes in a network for vulnerabilities, selecting a first one of the plurality of processing nodes not in the subset, and determining a similarity measure between the first processing node and at least a second one of the processing nodes in the subset identified as having a given vulnerability. Determining the similarity measure comprises determining a first similarity between one or more vulnerabilities previously detected on the first processing node and the second processing node and determining a second similarity between one or more attributes of the first processing node and the second processing node, the similarity measure being based at least in part on the first and second similarities. The method also comprises identifying that the first processing node has the given vulnerability based at least in part on the similarity measure between the first processing node and the second processing node, and modifying access to the first processing node responsive to identifying that the first processing node has the given vulnerability. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Governance, risk and compliance (GRC) systems, such as RSA Archer® available from Dell EMC of Hopkinton, Mass., include Vulnerability and Risk Management (VRM) solutions for managing and addressing risks that arise from the existence of vulnerabilities in an enterprise network. Some solutions rely on vulnerability scanners, such as those available from Rapid7® and Qualys®, which may be used to periodically scan devices in the enterprise network in order to find known vulnerabilities and to report such findings to a VRM system that manages the vulnerabilities in the enterprise network. This scanning activity over the enterprise network, however, may be extremely slow and require significant resources. Therefore, vulnerability scanning is often done relatively infrequently, such as on a monthly basis. Further, such scanning may malfunction or lead to incomplete results because some devices may be offline during the scan.

As enterprise networks continue to grow in scale, the number of devices in the network exacerbates such issues. Enterprise networks may also include new and different types of devices that are not designed to be online at all times. For example, in the Internet of Things (IoT) context, some devices are by definition designed not to be online or connected at all times. Further, the amount of devices is increasing in scale making these issues more challenging. As another example, enterprise networks such as cloud computing and other networks may utilize virtualized computing resources, such as virtual machines (VMs) and containers. Such VMs and containers may be started and stopped or spawned and taken down over time, making scanning for vulnerabilities difficult as the VMs and containers are not necessarily expected to be online at all times.

Illustrative embodiments provide techniques for enterprises to discover vulnerabilities that missed being scanned correctly by a vulnerabilities scanner, and thus provide improved visibility into the vulnerabilities of the enterprise. While various embodiments are described below in the context of scanning devices such as IoT devices, it should be appreciated that the techniques described are more generally applicable to vulnerability detection for different types of devices, and for vulnerability detection in virtualized computing resources such as VMs, containers, etc. The term "processing node" as used herein refers to such devices (e.g., IoT and other devices) and virtualized computing resources (e.g., VMs, containers, etc.). In some embodiments, techniques for discovering vulnerabilities involve scanning only a subset of available or online processing nodes, such as certain designated representative processing nodes, and utilizing techniques for determining similarity of such representative processing nodes with other processing nodes in the network that may or may not be online or available during the scan of the representative processing nodes. Such approaches may be used to reduce scanning time and thus provide various improvements related to reduced resource usage, allowing increased frequency of scanning which provides increased security, etc.

Figure 1:
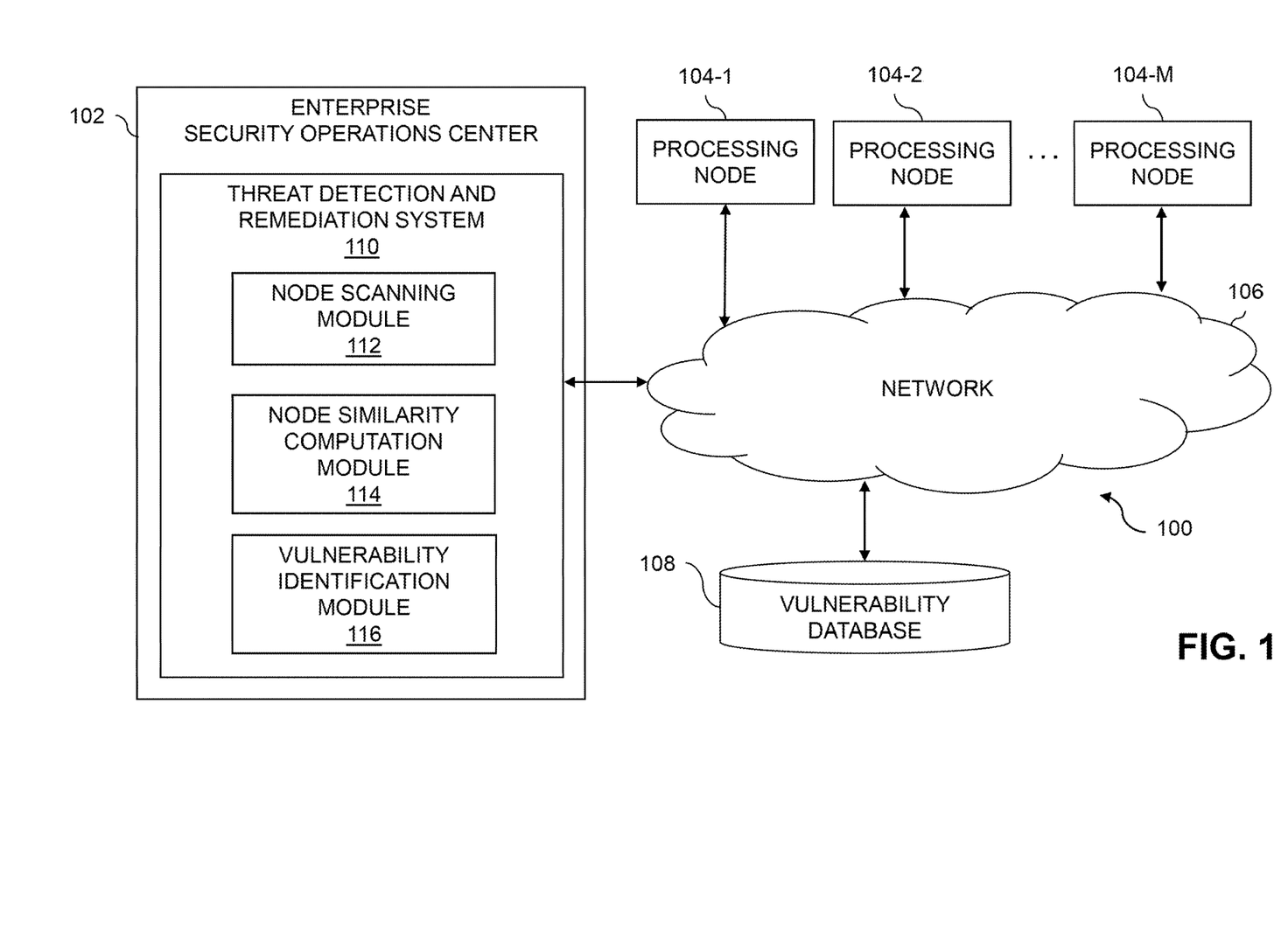
FIG. 1 is a block diagram of an information processing system for identifying vulnerabilities in processing nodes in an illustrative embodiment of the invention.

FIG. 1 shows an information processing system 100 configured in accordance with an illustrative embodiment. The information processing system 100 is assumed to be built on at least one processing platform and provides functionality for discovering vulnerabilities in an enterprise network, including discovering vulnerabilities for offline or other processing nodes not scanned for vulnerabilities during a scan of the enterprise network.

In this embodiment, the system 100 more particularly comprises an enterprise security operations center (SOC) 102 and a plurality of processing nodes 104-1, 104-2, . . . 104-M, collectively referred to herein as processing nodes 104. The processing nodes 104 are coupled to a network 106. Also coupled to the network 106 is a vulnerability database 108, which may store various information relating to vulnerability detection.

The processing nodes 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The processing nodes 104 may also or alternately comprise virtualized computing resources, such as VMs, containers, etc.

The processing nodes 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The vulnerability database 108, as discussed above, is configured to store and record information relating to vulnerabilities in processing nodes 104. The vulnerability database 108 may also or alternatively store information such as results of scanning for vulnerabilities in processing nodes 104, profiles or asset records for the processing nodes 104, etc.

The vulnerability database 108 in some embodiments is implemented using one or more storage systems or devices associated with the enterprise SOC 102. In some embodiments, one or more of the storage systems utilized to implement the vulnerability database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to processing nodes 104, or to a system administrator, information technology (IT) manager, or other authorized personnel via one or more security or host agents. Such security or host agents may be implemented via the processing nodes 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security or host agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more of the processing nodes 104 having one or more designated vulnerabilities (or which exhibit a threshold level of similarity to one or more other ones of the processing nodes having such designated vulnerabilities), requiring user input or authentication to obtain information from or otherwise utilize one or more of the processing nodes 104 having one or more designated vulnerabilities (or which exhibit a threshold level of similarity to one or more other ones of the processing nodes having such designated vulnerabilities), triggering further review of one or more of the processing nodes 104 that have certain designated vulnerabilities (or which exhibit a threshold level of similarity to one or more other ones of the processing nodes having such designated vulnerabilities), etc. Remedial measures may also include applying patches or fixes to address identified vulnerabilities.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 110. As will be described in further detail below, the threat detection and remediation system 110 is configured to identify vulnerabilities in the processing nodes 104 in various use case scenarios.

In some embodiments, the threat detection and remediation system 110 provides a service for scanning vulnerabilities in the processing nodes 104 of an enterprise network with functionality for detecting vulnerabilities in ones of the processing nodes 104 that are either offline or fail to be successfully scanned during the scan for vulnerabilities. In other embodiments, the threat detection and remediation system 110 provides a service for more efficient scanning of vulnerabilities in the processing nodes 104 of the enterprise network, such as by selecting a subset of representative ones of the processing nodes 104 and using the detected vulnerabilities for such representative ones of the processing nodes 104 to infer the vulnerabilities of other ones of the processing nodes 104 exhibiting a threshold level of similarity to the representative processing nodes 104. In still other embodiments, these use cases may be combined.

It is to be noted that the use cases described above are presented by way of example only, and that embodiments are not limited to these specific use cases.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the processing nodes 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110. In the FIG. 1 embodiment, the threat detection and remediation system 110 comprises a node scanning module 112, a node similarity computation module 114 and a vulnerability identification module 116.

The node scanning module 112 is configured to scan at least a subset of the processing nodes 104 in an enterprise network for vulnerabilities. The node scanning module 112 may utilize various vulnerability scanning tools. The node similarity computation module 114 is configured to select a first one of the processing nodes 104 (e.g., 104-1) that is not in the subset of processing nodes 104 scanned by the node scanning module 112. The node similarity computation module 114 is further configured to determine a similarity between the first processing node 104-1 and at least a second one of the processing nodes (e.g., 104-2) in the subset identified as having a given vulnerability. Determining the similarity may include determining a first similarity between vulnerabilities previously detected on the first processing node 104-1 and the second processing node 104-2, and determining a second similarity between attributes of the first processing node 104-1 and the second processing node 104-2.

The vulnerability identification module 116 is configured to identify that the first processing node 104-1 has the given vulnerability based at least in part on the determined similarity between the first processing node 104-1 and the second processing node 104-2. In some embodiments, the identification or prediction that the first processing node 104-1 has the given vulnerability may be based on the determined similarity between the first processing node 104-1 and a group of similar processing nodes (e.g., the second processing node 104-2 and one or more additional processing nodes that have a similarity higher than some designated threshold, or a top-k similar processing nodes), and the weighted ratio of those processing nodes in the group that have and do not have the given vulnerability. It should be noted that in this context, identifying that the first processing node 104-1 "has" the given vulnerability may refer to determining that the first processing node 104-1 is likely to have the given vulnerability based on its similarity to the second processing node 104-2 that also has the given vulnerability. The first processing node 104-1 is thus assumed to "have" the given vulnerability for security purposes based on a threshold similarity between the first processing node 104-1 and the second processing node 104-2. In some instances, this may result in false positives for identification of vulnerabilities in the first processing node 104-1. The tradeoff between false positives and false negatives may be adjusted by changing the threshold for determining similarity between the first processing node 104-1 and the second processing node 104-2 as desired. The vulnerability identification module 116 is further configured to modify access to the first processing node 104-1 responsive to identifying that the first processing node 104-1 has the given vulnerability. Modifying access, as described elsewhere herein, may include a number of different possible remedial actions or measures. The particular action taken to modify access may be an action that is defined in procedures of a particular entity and its vulnerability risk management team. Thus, different entities or different vulnerability risk management teams or personnel may specify different remedial action to take to modify access to processing nodes that are identified as having the given vulnerability. Additional details regarding the node scanning module 112, node similarity computation module 114 and vulnerability identification module 116 will be described in further detail below.

It is to be appreciated that the particular arrangement of the enterprise SOC 102, threat detection and remediation system 110, node scanning module 112, node similarity computation module 114 and vulnerability identification module 116 illustrated in the FIG. 1 embodiment is presented by way of example only, and alternative arrangements can be used in other embodiments. As discussed above, for example, the enterprise SOC 102, threat detection and remediation system 110, node scanning module 112, node similarity computation module 114 and vulnerability identification module 116 may in some embodiments be implemented internal to one or more of the processing nodes 104. As another example, the functionality associated with the node scanning module 112, node similarity computation module 114 and vulnerability identification module 116 may be combined into one module, or separated across more than three modules with the multiple modules possibly being implemented with multiple distinct processors or processing devices.

At least portions of the node scanning module 112, node similarity computation module 114 and vulnerability identification module 116 may be implemented at least in part in the form of software that is stored in memory and executed by a processor.

It is to be understood that the particular set of elements shown in FIG. 1 for vulnerability detection is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC), a security analytics system, a security information and event management (SIEM) system, a GRC system, etc.

The threat detection and remediation system 110 and other portions of the system 100, as will be described in further detail below, may be part of cloud infrastructure such as an Amazon Web Services (AWS) system. Other examples of cloud-based systems that can be used to provide the threat detection and remediation system 110 include Google Cloud Platform (GCP) and Microsoft Azure.

The threat detection and remediation system 110 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The processing nodes 104 and threat detection and remediation system 110 or components thereof (e.g., node scanning module 112, node similarity computation module 114 and vulnerability identification module 116) may be implemented on respective distinct processing platforms, although numerous other arrangements are possible. For example, in some embodiments at least portions of the threat detection and remediation system 110 and one or more of the processing nodes 104 are implemented on the same processing platform. A given processing node (e.g., 104-1) can therefore be implemented at least in part within at least one processing platform that implements at least a portion of the threat detection and remediation system 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the processing nodes 104, threat detection and remediation system 110 or portions or components thereof, to reside in different data centers. Numerous other distributed implementations are possible. The threat detection and remediation system 110 can also be implemented in a distributed manner across multiple data centers.

Additional examples of processing platforms utilized to implement threat detection and remediation system 110 in illustrative embodiments will be described in more detail below in conjunction with FIGS. 4 and 5.

It is to be appreciated that these and other features of illustrative embodiments are presented by way of example only, and should not be construed as limiting in any way.

Figure 2:
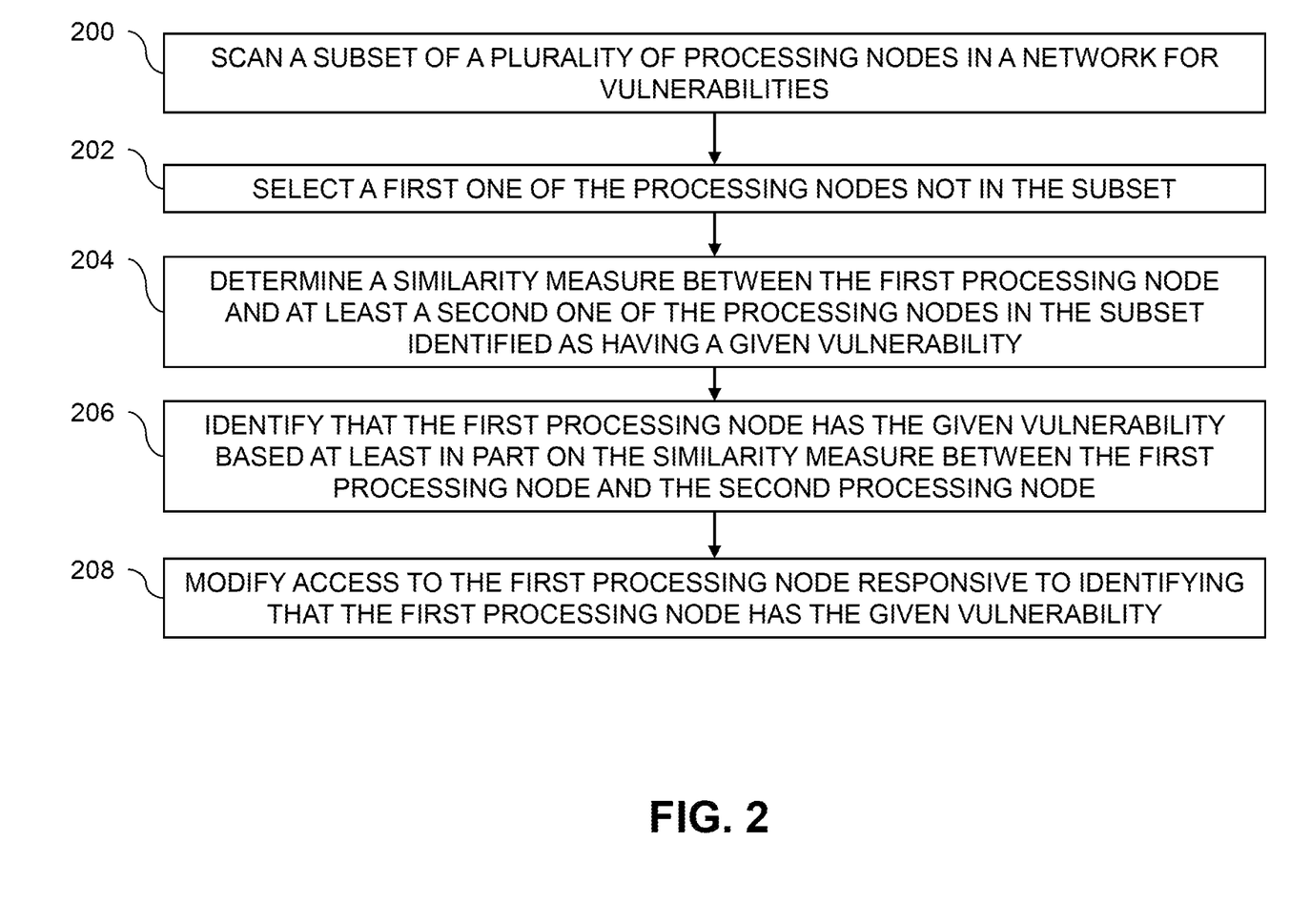
FIG. 2 is a flow diagram of an exemplary process for identifying vulnerabilities in processing nodes in an illustrative embodiment.

An exemplary process for identifying vulnerabilities in processing nodes will now be described in more detail with reference to the flow diagram of FIG. 2. It is to be understood that this particular process is only an example, and that additional or alternative processes for identifying vulnerabilities in processing nodes can be carried out in other embodiments.

In this embodiment, the process includes steps 200 through 208. These steps are assumed to be performed by the threat detection and remediation system 110 utilizing the node scanning module 112, node similarity computation module 114 and vulnerability identification module 116. The process begins with step 200, scanning a subset of a plurality of processing nodes (e.g., 104) in a network for vulnerabilities. The subset may include those processing nodes 104 that are connected to the network or are online during the scanning in step 200. In some embodiments, the subset may include a set of representative processing nodes. The representative processing nodes may be selected based on their determined similarity to other processing nodes not in the subset (e.g., using similarity determinations similar to that described below with respect to step 204). The scanning in step 200 may utilize one or more vulnerability scanning tools to provide scan results for each of the processing nodes in the subset. The scan results may include, for each processing node in the subset, a time stamp, a unique identifier for that processing node, and a list of vulnerabilities found on that processing node.

In step 202, a first one of the processing nodes (e.g., 104-1) not in the subset is selected. The first processing node 104-1 may be one that is not connected to the network during the scanning in step 200, or one for which the scanning in step 200 did not complete successfully. The first processing node 104-1 may be an IoT device, a VM, a container, etc.

The process continues with step 204, determining a similarity measure between the first processing node 104-1 and at least a second one of the processing nodes (e.g., 104-2) in the subset identified as having a given vulnerability. Step 204 may include determining a first similarity between one or more vulnerabilities previously detected on the first processing node 104-1 and the second processing node 104-2, and determining a second similarity between one or more attributes of the first processing node 104-1 and the second processing node 104-2.

Determining the first similarity may include generating a first vulnerability vector for the first processing node 104-1 and generating a second vulnerability vector for the second processing node 104-2. The first and second vulnerability vectors include entries indicating whether respective ones of a set of vulnerabilities have been detected on the first processing node 104-1 and the second processing node 104-2. A cosine similarity or other similarity measure is then computed between the first and second vulnerability vectors. In some embodiments, the first and second vulnerability vectors are one-hot-encoding vectors.

Determining the second similarity may include generating a first attribute vector for the first processing node 104-1 and generating a second attribute vector for the second processing node 104-2. The first and second attribute vectors include entries indicating values for respective ones of a set of attributes. A cosine similarity or other similarity measure is then computed between the first and second attribute vectors. The attributes of the first processing node 104-1 and the second processing node 104-2 may be obtained from a vulnerability database (e.g., 108) storing asset records for the plurality of processing nodes, the asset records comprising attributes including one or more of an OS, a criticality, and a location of a corresponding processing node.

In step 206, the first processing node 104-1 is identified as having the given vulnerability identified in the second processing node 104-2 during scanning in step 200 based at least in part on the similarity measure between the first processing node 104-1 and the second processing node 104-2 determined in step 204. Step 206 may include selecting a designated number of the processing nodes in the subset having: (i) determined similarity with the first processing node 104-1 exceeding a first threshold similarity; and (ii) scanning results more recent than a latest scanning result for the first processing node 104-1. Step 206 may further include computing a weighted function (e.g., weighted average, median, etc.) of the similarities between the first processing node 104-1 and the selected processing nodes in the subset. Step 206 includes identifying that the first processing node 104-1 has the given vulnerability when the weighted function of the selected processing nodes in the subset with the given vulnerability exceeds a second threshold.

The process concludes with step 208, modifying access to the first processing node 104-1 responsive to identifying that the first processing node 104-1 has the given vulnerability. Modifying access to the first processing node 104-1 may include blocking the first processing node 104-1 from connecting to the network, removing the given vulnerability from the first processing node 104-1 (e.g., by providing or installing a patch, update or other fix to the first processing node), generating an alert indicating that the first processing node 104-1 has the given vulnerability, etc.

In some embodiments, a VRM solution is provided within a GRC system (e.g., threat detection and remediation system 110) of an enterprise. The VRM solution includes vulnerability scanners (e.g., Rapid7®, Qualys® or other vulnerability detection tools, etc.) that provide scan results for each processing node that they scan. The scan results may illustratively include timestamps, a unique processing node identifier, and a list of vulnerabilities that were found on that processing node. The GRC system maintains asset records for the processing nodes, such as in a database (e.g., vulnerabilities database 108). The asset records may include various attributes for the processing nodes, including by way of example the operating system (OS) type, business unit, asset criticality, location, etc. In some embodiments, it is assumed that asset records are available even for processing nodes that are offline or otherwise unavailable during a scanning operation. It is possible, however, that there may be missing values or attributes in various asset records, possibly due to processing nodes being offline during a scanning operation. Some processing nodes may also fail to report or make available information needed for determining certain attributes in the asset records. The vulnerabilities database 108 may also include scan results obtained using the vulnerability scanners.

Given the above, some embodiments may proceed with detecting existing vulnerabilities in processing nodes that were offline, missed due to an incomplete scan or otherwise not scanned during a scanning operation. First, a similarity function between processing nodes is defined. It should be noted that one or several similarity measures may be selected for this purpose. In the description below, it is assumed that the similarity between two processing nodes is derived through a combination of: (i) the similarity between vulnerabilities already detected on both processing nodes; and (ii) the similarity between the attributes of the processing nodes (e.g., as defined in asset records for the processing nodes maintained by the GRC system). The following equation describes an exemplary way of computing this similarity:

$$W(a,u) = \max\{\cos\_sim(V_a, V_u), \cos\_sim(R_a, R_u)\} \quad (1)$$

Where $V_a$ and $V_u$ denote the vulnerability vectors for devices a and u, respectively, where $R_a$ and $R_u$ denote the attribute vectors for devices a and u, respectively, and where cos_sim denotes cosine similarity.

Cosine similarity is an example of a similarity measure that may be utilized in some embodiments. Cosine similarity is a measure of similarity between non-zero vectors, which measures the cosine of the angle between the vectors. The cosine of 0° is 1, and it is less than 1 for any other angle in the interval between 0° and 90°, and is thus a judgment of orientation rather than magnitude. Two vectors with a same orientation have a cosine similarity of 1, while two vectors oriented at 90° relative to each other have a similarity of 0. Using cosine similarity, vectors that are parallel are considered maximally similar while vectors that are orthogonal are considered maximally dissimilar.

Figure 3:
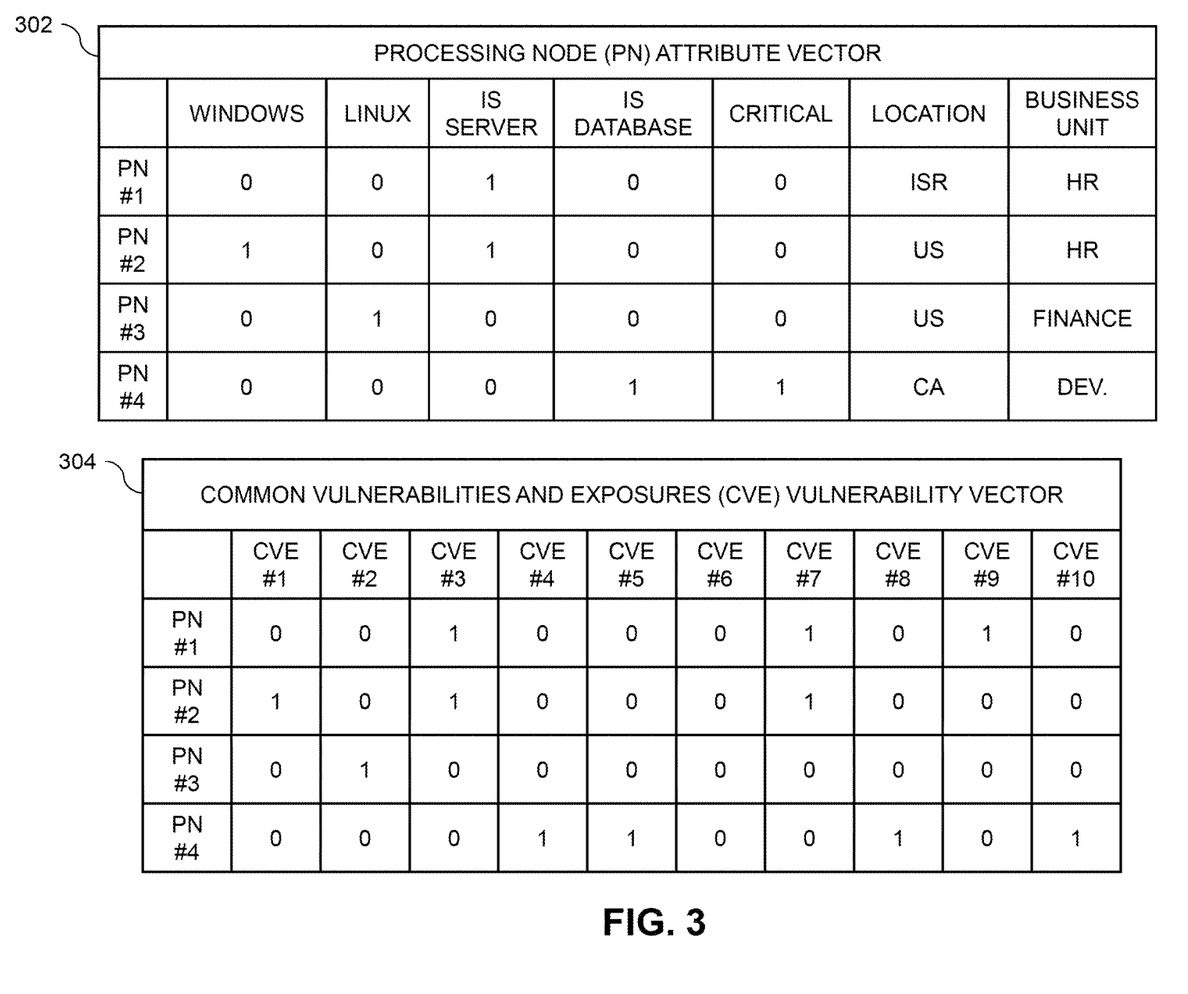
FIG. 3 shows examples of attribute and vulnerability vectors in an illustrative embodiment.

FIG. 3 shows examples of an attribute vector table 302 and a vulnerability vector table 304. The attribute vector table 302 includes vectors for processing nodes that contain processing-node specific attributes of the processing nodes. For example, the attributes of the attribute vectors in attribute vector table 302 include OS type (e.g., Windows and Linux), whether the processing node is a server, whether the processing node is a database, whether the processing node is considered critical, a location of the processing node, and a business unit associated with the processing node. The vulnerability vector table 304 in the FIG. 3 example includes vulnerability vectors for processing nodes that are in the form of a one-hot-encoding vector, where each place in the vector represents a specific vulnerability (e.g., respective publicly known information-security vulnerabilities provide by a Common Vulnerabilities and Exposures (CVE) system). The value for an entry is "1" if the vulnerability was detected on the processing node, and "0" otherwise.

Using the attribute vector table 302 and vulnerability vector table 304 of FIG. 3, a cosine similarity may be computed for each pair of entries (for respective pairs of the processing nodes). It should be appreciated, however, that embodiments are not limited solely to use with cosine similarity, and that other similarity measures may be used in other embodiments. It should also be appreciated that embodiments are not limited solely to use with particular features or attributes shown in attribute vector table 302. For example, in some embodiments, a similarity measure may be based at least in part on other features (e.g., time of creation, etc.) and using other similarity measures (e.g., Euclidean distance, etc.).

For a given processing node, a top k (e.g., k=30) similar processing nodes may then be selected. A threshold of similarity may also be set, to avoid selecting non-similar processing nodes just to reach k. The selected similar processing nodes in some embodiments should also comply with the following: (i) the selected similar processing node should have a scan result after a most recent scan result of the given processing node; and (ii) the scan result for the selected similar processing node was completed with no error. In other embodiments, the selected similar processing nodes need not necessarily comply with both (i) and (ii). For example, a processing node may be selected as a similar processing node for the given processing node if (i) is met, even if the scan result for that processing node is only partially complete.

After selection of the similar processing nodes, a weighted average for the selected similar processing nodes may be computed, where the weights are the similarity between the processing nodes. The weighted average may be computed in accordance with the following equation:

$$P_{a,v} = \left( \frac{\sum_{u=1}^{n} L_{u,v} * W_{a,u}}{\sum_{u=1}^{n} W_{a,u}} \right) \quad (2)$$

where $P_{a,v}$ is the estimation that the given processing node a has a vulnerability v, $L_{u,v}$ is "1" if vulnerability v exists on processing node u and is "0" otherwise, where u∈ the selected similar processing nodes (e.g., u is a top-k similar processing node for the given processing node). If the estimation $P_{a,v}$ is above a designated threshold, the GRC system generates an alert that an undetected vulnerability is highly probable on the given processing node. This alert may trigger various remedial actions as discussed elsewhere herein (e.g., triggering a scan of the given processing node, blocking access to the given processing node, applying a patch or fix for the undetected vulnerability, etc.).

In some embodiments, the undetected vulnerability estimation may be performed for all or some subject of the processing nodes in an enterprise network, and the GRC system may show a prioritized list of probable vulnerabilities listed according to the $P_{a,v}$ estimation score.

Illustrative embodiments provide a number of advantages relative to conventional approaches. For example, conventional approaches for detecting vulnerabilities are often based on a heavy scan of the network that consumes significant resources, takes a long time, and may result in devices that go un-scanned for long periods of time. Conventional approaches also rely on devices being connected to the network during the time of the scan in order to find vulnerabilities. Also, vulnerability scanners often make use of device characteristics only (e.g., OS, patches, etc.) and have no or limited visibility into the device's context (e.g., business unit, criticality, role, etc.). This limits the ability of conventional approaches to make good estimations about similarity to other devices that are scanned.

Illustrative embodiments provide various advantages over such conventional approaches. For example, the techniques described herein allow for detection of vulnerabilities on processing nodes that have not been scanned, or which were missed during a scan for various reasons (e.g., being out of network or offline, scanning errors, etc.). The techniques described herein further make use of information about the context of the processing node in order to gain good estimation of the similarity of the processing node to other processing nodes that were already and recently scanned. Embodiments described herein can also be run efficiently offline, without using any significant resources from an enterprise network. Embodiments can also be extended to provide support across processing nodes distributed worldwide possibly among multiple distinct enterprises or enterprise networks, thus allowing better cooperation between multiple entities or between different portions of a same entity facing vulnerabilities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for identifying vulnerabilities in processing nodes will now be described in greater detail with reference to FIGS. 4 and 5. Although described in the context of system 100, these platforms may also be used to implement at least portions of other information processing systems in other embodiments.

Figure 4:
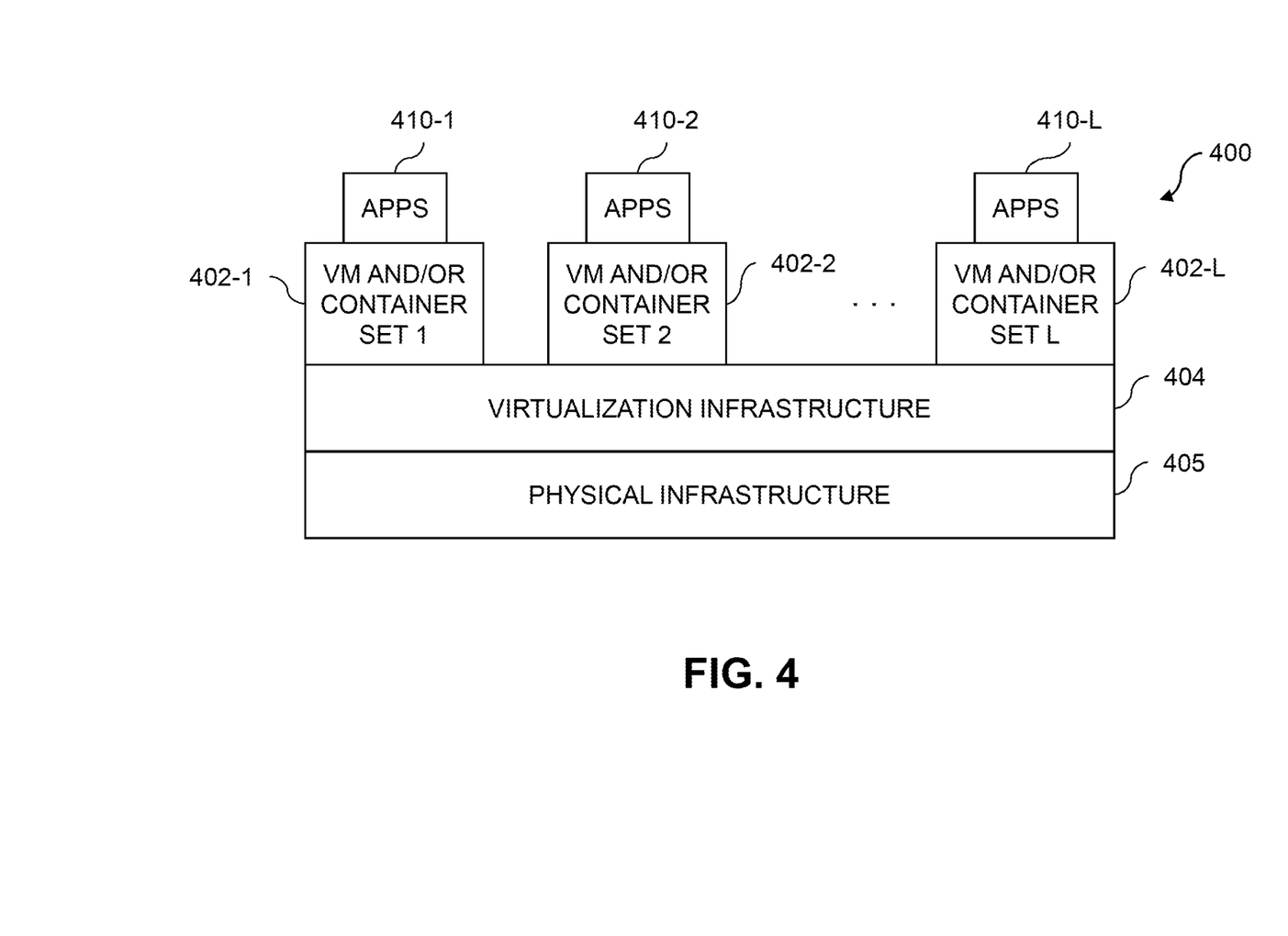
FIGS. 4 and 5 show examples of processing platforms that may be utilized to implement at least a portion of an information processing system in illustrative embodiments.
Figure 5:
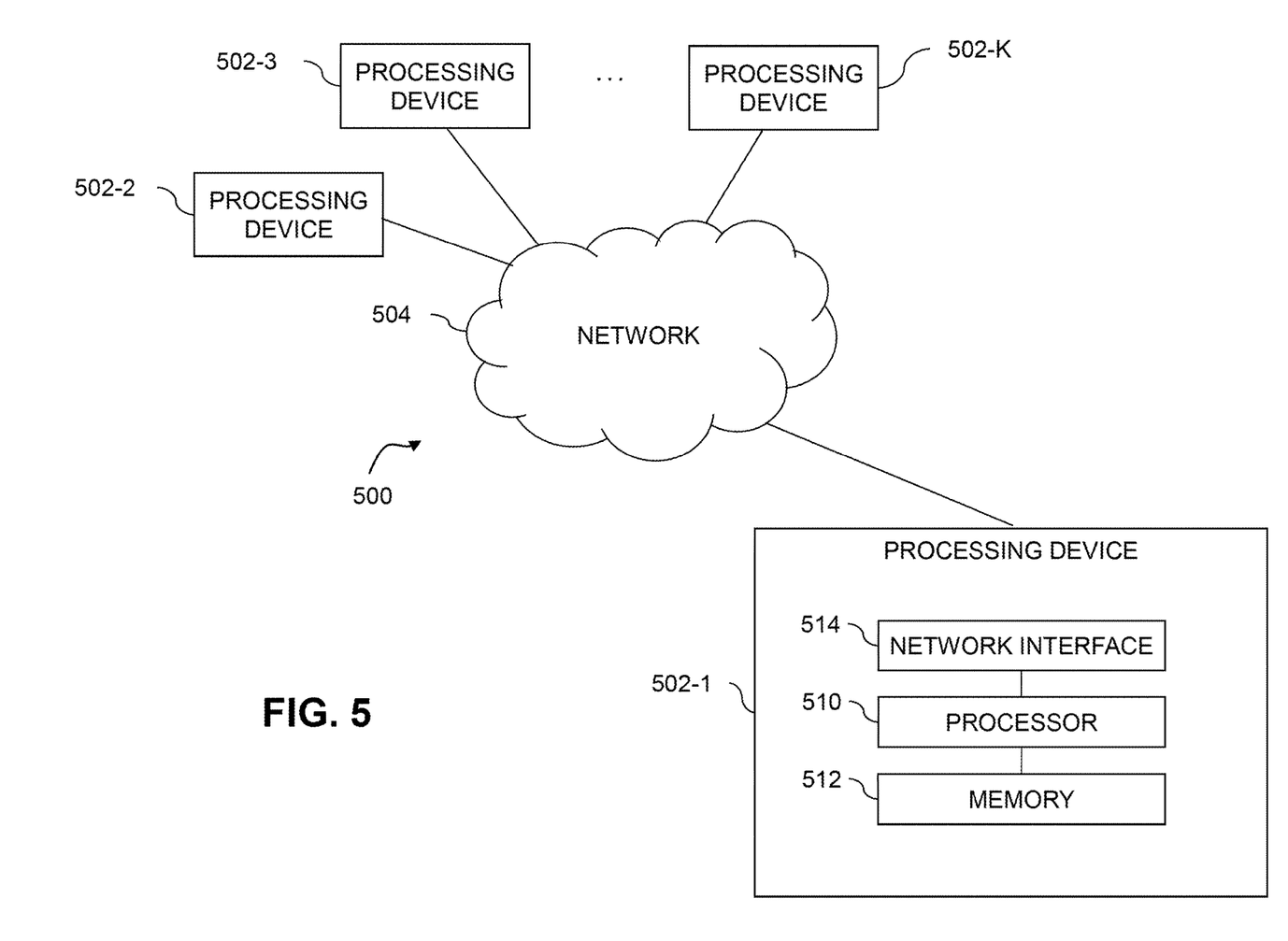

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 1104 that comprises at least one hypervisor. An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the adaptive threshold generation functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing nodes, vulnerabilities, attributes, similarity measures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

scanning a subset of a plurality of processing nodes in a network for vulnerabilities;

selecting a first processing node of the plurality of processing nodes not in the subset;

determining a similarity measure between the first processing node and at least a second processing node of the plurality of processing nodes in the subset, the second processing node being identified as having a given vulnerability, wherein determining the similarity measure comprises determining a first similarity between one or more vulnerabilities previously detected on the first processing node and the second processing node and determining a second similarity between one or more attributes of the first processing node and the second processing, the similarity measure being based at least in part on the first and second similarities;

identifying that the first processing node has the given vulnerability based at least in part on the similarity measure between the first processing node and the second processing node; and modifying access to the first processing node responsive to identifying that the first processing node has the given vulnerability;

wherein identifying that the first processing node has the given vulnerability is further based at least in part on a combination of the similarity measure between the first processing node and the second processing node and one or more additional similarity measures between the first processing node and one or more additional processing nodes of the plurality of processing nodes in the subset, each of the one or more additional processing nodes having: (i) determined similarity with the first processing node exceeding a first threshold similarity; and (ii) scanning results more recent than a latest scanning result for the first processing node;

wherein the method is performed by at least one processing device comprising a processor coupled to a memory.

2. The method of claim 1 wherein the first processing node is not connected to the network during scanning of the subset of the plurality of processing nodes.

3. The method of claim 1 wherein a scan of the first processing node was not completed during scanning of the subset of the plurality of processing nodes.

4. The method of claim 1 wherein the subset of processing nodes comprise respective representative processing nodes.

5. The method of claim 4 wherein the representative processing nodes in the subset are selected based on the first similarity and the second similarity.

6. The method of claim 1 wherein the first processing node comprises an Internet of Things (IoT) processing device.

7. The method of claim 1 wherein the first processing node comprises at least one of a virtual machine and a container.

8. The method of claim 1 wherein scanning the subset of the plurality of processing nodes comprises utilizing one or more vulnerability scanning tools to provide scan results for each of the processing nodes in the subset, the scan result comprising a time stamp, a unique identifier for that processing node, and a list of vulnerabilities found on that processing node.

9. The method of claim 1 wherein determining the first similarity comprises:
generating a first vulnerability vector for the first processing node, the first vulnerability vector comprising entries indicating whether respective ones of a set of vulnerabilities have been detected on the first processing node;
generating a second vulnerability vector for the second processing node, the second vulnerability vector comprising entries indicating whether respective ones of the set of vulnerabilities were detected on the second processing node;
computing the first similarity between the first vulnerability vector and the second vulnerability vector.

10. The method of claim 9 wherein computing the first similarity between the first vulnerability vector and the second vulnerability vector comprises computing a cosine similarity.

11. The method of claim 1 wherein determining the second similarity comprises:
generating a first attribute vector for the first processing node, the first attribute vector comprising entries indicating values for respective ones of a set of attributes;
generating a second attribute vector for the second processing node, the second attribute vector comprising entries indicating values for respective ones of the set of attributes;
computing the second similarity between the first attribute vector and the second attribute vector.

12. The method of claim 11 further comprising obtaining the attributes of the first processing node and the second processing node from a vulnerability database storing asset records for the plurality of processing nodes, the asset records comprising attributes including one or more of an operating system, a criticality, and a location of a corresponding processing node.

13. The method of claim 1 wherein identifying that the first processing node has the given vulnerability comprises selecting a designated number of the one or more additional processing nodes in the subset having: (i) determined similarity with the first processing node exceeding the first threshold similarity; and (ii) scanning results more recent than the latest scanning result for the first processing node.

14. The method of claim 13 wherein identifying that the first processing node has the given vulnerability further comprises computing a weighted function of the similarities between the first processing node and the selected processing nodes in the subset, the selected processing nodes in the subset comprising the second processing node and the designated number of the one or more additional processing nodes in the subset.

15. The method of claim 14 further comprising identifying that the first processing node has the given vulnerability when the weighted function of the selected processing nodes in the subset with the given vulnerability exceeds a second threshold similarity.

16. The method of claim 1 wherein modifying access to the first processing node comprises at least one of:
blocking the first processing node from connecting to the network;
removing the given vulnerability from the first processing node; and
generating an alert indicating that the first processing node has the given vulnerability.

17. A computer program product comprising a non-transitory processor-readable storage medium having stored therein program code of one or more software programs, wherein the program code when executed by at least one processing device causes the at least one processing device:
to scan a subset of a plurality of processing nodes in a network for vulnerabilities;
to select a first processing node of the plurality of processing nodes not in the subset;
to determine a similarity measure between the first processing node and at least a second processing node of the plurality of processing nodes in the subset, the second processing node being identified as having a given vulnerability, wherein determining the similarity measure comprises determining a first similarity between one or more vulnerabilities previously detected on the first processing node and the second processing node and determining a second similarity between one or more attributes of the first processing node and the second processing node, the similarity measure being based at least in part on the first and second similarities;
to identify that the first processing node has the given vulnerability based at least in part on the similarity measure between the first processing node and the second processing node; and
to modify access to the first processing node responsive to identifying that the first processing node has the given vulnerability;
wherein identifying that the first processing node has the given vulnerability is further based at least in part on a combination of the similarity measure between the first processing node and the second processing node and one or more additional similarity measures between the first processing node and one or more additional processing nodes of the plurality of processing nodes in the subset, each of the one or more additional processing nodes having: (i) determined similarity with the first processing node exceeding a first threshold similarity; and (ii) scanning results more recent than a latest scanning result for the first processing node.

18. The computer program product of claim 17 wherein identifying that the first processing node has the given vulnerability comprises:
selecting a designated number of the one or more additional processing nodes in the subset having: (i) determined similarity with the first processing node exceeding the first threshold similarity; and (ii) scanning results more recent than the latest scanning result for the first processing node;

computing a weighted function of the similarities between the first processing node and the selected processing nodes in the subset, the selected processing nodes in the subset comprising the second processing node and the designated number of the one or more additional processing nodes in the subset; and identifying that the first processing node has the given vulnerability when the weighted function of the selected processing nodes in the subset with the given vulnerability exceeds a second threshold similarity.

19. An apparatus comprising:

at least one processing device comprising a processor coupled to a memory;

the at least one processing device being configured:

to scan a subset of a plurality of processing nodes in a network for vulnerabilities;

to select a first processing node of the plurality of processing nodes not in the subset;

to determine a similarity measure between the first processing node and at least a second processing node of the plurality of processing nodes in the subset, the second processing node being identified as having a given vulnerability, wherein determining the similarity measure comprises determining a first similarity between one or more vulnerabilities previously detected on the first processing node and the second processing node and determining a second similarity between one or more attributes of the first processing node and the second processing node, the similarity measure being based at least in part on the first and second similarities;

to identify that the first processing node has the given vulnerability based at least in part on the similarity measure between the first processing node and the second processing node; and     to modify access to the first processing node responsive to identifying that the first processing node has the given vulnerability;

wherein identifying that the first processing node has the given vulnerability is further based at least in part on a combination of the similarity measure between the first processing node and the second processing node and one or more additional similarity measures between the first processing node and one or more additional processing nodes of the plurality of processing nodes in the subset, each of the one or more additional processing nodes having: (i) determined similarity with the first processing node exceeding a first threshold similarity; and (ii) scanning results more recent than a latest scanning result for the first processing node.

20. The apparatus of claim 19 wherein identifying that the first processing node has the given vulnerability comprises:

selecting a designated number of the one or more additional processing nodes in the subset having: (i) determined similarity with the first processing node exceeding the first threshold similarity; and (ii) scanning results more recent than the latest scanning result for the first processing node;

computing a weighted function of the similarities between the first processing node and the selected processing nodes in the subset, the selected processing nodes in the subset comprising the second processing node and the designated number of the one or more additional processing nodes in the subset; and identifying that the first processing node has the given vulnerability when the weighted function of the selected processing nodes in the subset with the given vulnerability exceeds a second threshold similarity.

\* \* \* \* \*